Figure 1:
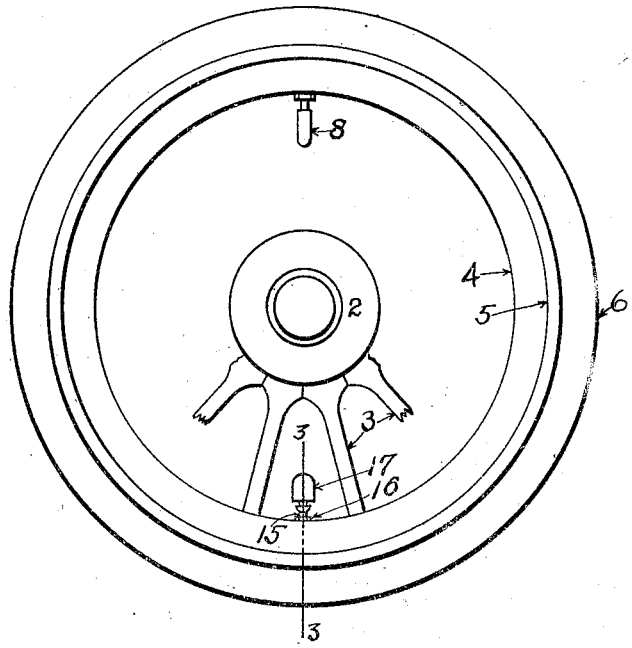

S. SILVERMAN & J. E. TRAHAN.
SIGNAL FOR PNEUMATIC TIRES.
APPLICATION FILED FEB. 18, 1909.

944,971.

Patented Dec. 28, 1909.
2 SHEETS—SHEET 1.

Witnesses:
J. F. Brewer,
R. L. Wallace

Inventors,
Samuel Silverman,
Joseph E. Trahan,
By Harry De Wallace,
Attorney.

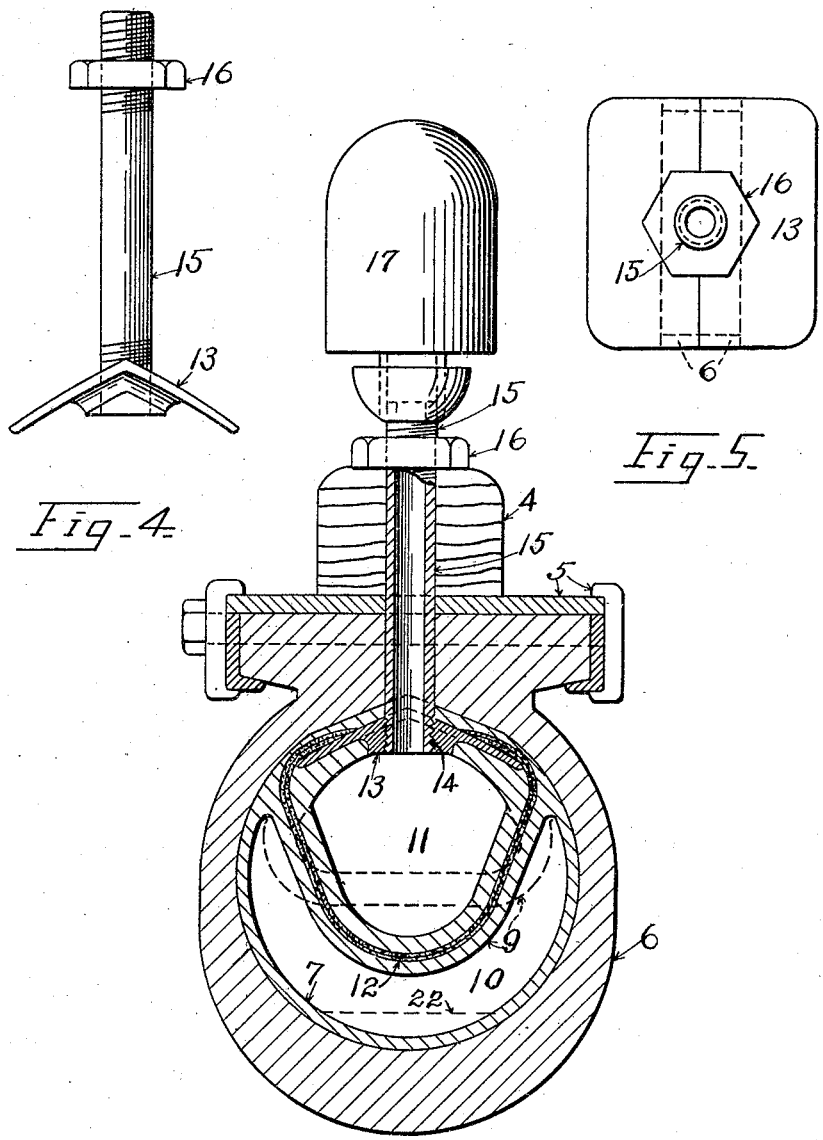

UNITED STATES PATENT OFFICE.

SAMUEL SILVERMAN AND JOSEPH E. TRAHAN, OF WATERTOWN, NEW YORK; SAID TRAHAN ASSIGNOR TO SAID SILVERMAN.

SIGNAL FOR PNEUMATIC TIRES.

944,971.      Specification of Letters Patent.     Patented Dec. 28, 1909.

Application filed February 18, 1909. Serial No. 478,635.

*To all whom it may concern:*

Be it known that we, SAMUEL SILVERMAN and JOSEPH E. TRAHAN, citizens of the United States, residing at Watertown, in the county of Jefferson and State of New York, have invented certain new and useful Improvements in Signals for Pneumatic Tires, of which the following is a specification.
This invention relates to improvements in signals for pneumatic tires, designed for use in connection with the tires of automobiles and like vehicles, and has for its object to provide for giving an audible alarm in case the tires of a vehicle become partially or entirely deflated.

Automobiles and other vehicles upon which pneumatic tires are used, depend for their safe and proper operation upon the tires being inflated to a certain extent by air pressure. All such tires are liable to, and do for one reason or another, become more or less deflated during the operation of the vehicle, and require frequent pumping up.
Frequently the tires become deflated to a dangerous extent before the operator becomes aware of the fact, and punctures and other damages to the wheels result.

It is an object of the present invention to provide a signal or alarm, to be carried by each tire or wheel, which is self-sustaining and self-acting, and which when properly installed will give an audible warning instantly the pressure in the tire falls below a given point, and which will repeat the alarm once every revolution until the pressure of the affected wheel is restored. And a further object is to provide a device of the class which is simple, durable and inexpensive, comprising but few parts, and which will stand considerable wear and abuse and not get out of order.

The present invention consists principally of constructing the inner tube, which carries the air pressure for a pneumatic tire, in a manner to provide at a certain point in its length an integral flexible sack or bulb, adapted to be charged with atmospheric pressure, there being no communication between the inner tube and the said sack. The said bulb or sack being disposed on the inner circumferential side of the inner tube. The said sack having an opening or vent on the side facing the rim of the wheel, the said vent being threaded to receive a pipe which passes outwardly through the rim and felly of the wheel.

The invention further consists of a whistle or like air alarm, which is operatively connected to the outer end of the pipe. The construction and arrangement of the sack, tube and whistle being such that when the sack is compressed by pressure exerted upon the inner tube by the flattening of the outer tire or shoe, the air confined in the sack is forced outwardly through the tube for sounding the whistle.

Other features and parts of the invention will be understood from the detail description which follows, and by reference to the accompanying drawings which form a part of this specification, and in which—

Figure 2:
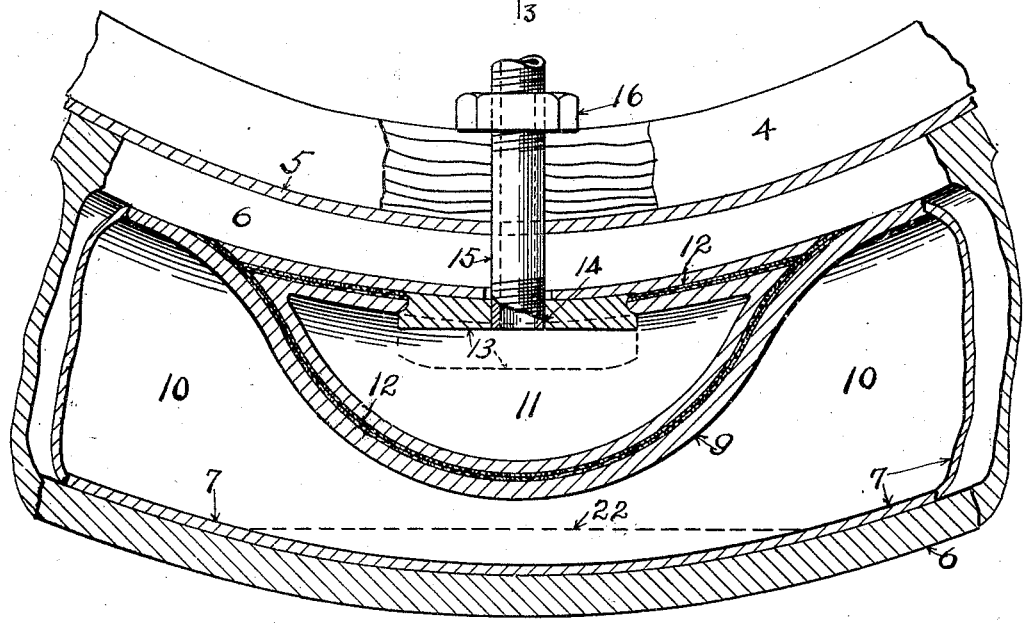

Figure 1 is a side view of a wheel having a pneumatic tire, to which our alarm is applied. Fig. 2 is an enlarged longitudinal section of a portion of a wheel, showing the manner of constructing and applying the several parts comprising the alarm mechanism, the whistle being omitted. Fig. 3 is an enlarged cross-section taken on line 3—3 of Fig. 1, showing the construction and arrangement of the complete device and its relation to the pneumatic tire parts. Fig. 4 is an enlarged view of the pipe and the metallic coupling part carried by the sack. Fig. 5 is a plan view of the parts shown in Fig. 4.

Similar numerals of reference designate corresponding parts throughout the several views.

In the drawings, 2 represents the hub, 3 the spokes, 4 the felly, 5 the rim, 6 the outer tire or shoe, and 7 the inner or air tube of a pneumatic wheel, the latter being inclosed within the shoe in the usual manner, and having the common filling tube 8.

The construction of the wheel may follow any of the well known methods. The inner tube 7 has the same functions and is applied as formerly, but to carry out the purposes and objects of our invention, we provide an inner or air tube to which is added an integral part, comprising a sack or bulb 9, which is preferably formed on the inner circumference opposite the filling tube 8. The arrangement of the inner tube at this point is such that, while the outward appearance of the tube is the same throughout its length, the hollow space in the tube is contracted at the point where the sack is located, by the inward bulging of the wall which separates the cavity 10 in the tube from the cavity or chamber 11 in the sack 9. The inner tube is intended to be made of soft flexible and elastic rubber the same as heretofore, but the portion which comprises the walls or shell of the sack 9, are preferably formed two or three times as thick as the rest of the tube, and these walls are also reinforced and rendered practically non-elastic by means of a fibrous or canvas binder or filter 12. Under this construction the sack or bulb 9 is compressible but it will not expand. The walls of the sack being made thicker than the tube 7 and also arched as shown by the cross-section, prevents the air pressure with which the tube 7 is charged when inflated from compressing or crushing the sack. In other words, the sack is intended to be so constructed and disposed that the air pressure of the inner tube 7 can neither enter nor contract the chamber 11 of the sack. The exposed side of the sack 9 is preferably made to conform to the inner surface of the shoe next to the rim of the wheel, as shown in Figs. 2 and 3.

13 represents a metallic part embedded centrally in the rim-side of the sack, for the purpose of stiffening and strengthening that part of the device, as well as to serve the purpose of a nut for connecting a pipe 15. The part 13 is perforated at 14 to afford communication with cavity 11, and this opening is threaded to receive the pipe 15, which passes through suitable openings in the rim and felly of the wheel. The outer end of pipe 15 is threaded and a jam-nut 16 is applied and screwed down tightly against the felly. By this means the sack is drawn against the inner wall of the shoe, and all of the parts are thus firmly held from shifting out of working position.

17 represents the signal or alarm, consisting of a whistle which may follow any of the well known constructions for air signals of the class. The base of the whistle is arranged to receive the threaded upper end of the pipe 15. This pipe therefore serves for conducting the air which may be expelled from chamber 11 of the sack 9 for blowing the whistle.

The sack 9 is intended to be filled or charged with atmospheric pressure only. When the device is in its normal or resting position as shown in Figs. 2 and 3, the sack will receive its supply of air through the whistle 17 and pipe 15 there being no other means for the air to reach the cavity 11. In the same views, the inner tube is represented as being inflated to its normal working extent. When the parts are in this condition the outer tire or shoe is held in proper working order or shape. To carry out the objects of our invention the rounded or bulging side of the pneumatic sack 9 should approach within one-half to three-quarters of an inch of the inner surface of the tread portion of the shoe, as shown by full lines in Figs. 2 and 3. When the sack is disposed in this manner the shoe may flatten to the usual extent as indicated by the dotted line 22, while working under normal conditions, as when the pressure of the tire is being fully maintained, and the sack will not be compressed and the whistle will remain silent, thus indicating that there has not been any loss of air from the inner tube 7. As soon, however, as the tire becomes deflated to an extent which will cause the shoe to flatten till it bears with some force against the bulging side of the sack, the pressure of the shoe assisted by the weight of the vehicle will then compress the sack, contract the chamber 11, as shown by dotted lines in Fig. 3, and expel a portion or all of the air confined in the sack, the expelled air passing out through the pipe 15 and sounding the whistle 17. As soon as the portion of the wheel having the sack applied leaves the road or track, the sack will immediately restore itself to normal shape, and in doing so it will become refilled with air drawn from the atmosphere through the whistle and vent pipe 15, and be ready to give another alarm when the wheel completes the next revolution, and so on, till the occupant of the vehicle heeds the warning, and stops the machine and pumps up the deflated tire.

Under this construction and arrangement of the signal parts, the signal will be sounded once each revolution after a tire has become deflated, or as often as that part of the wheel in which the bulb is located strikes the ground. Owing to the manner in which the device is constructed and applied the weight of the car is utilized to compress the bulb, although the pressure of the air in the inner tube cannot do so. Each time after the alarm is sounded by the exhausting of the air from chamber 11 of the bulb, through the tube 15 and the whistle, as the wheel continues its rotary movement, the bulb will refill, and be ready to give the whistle another blast when the next revolution of the wheel is completed. The more the tire becomes deflated, the louder and stronger will the whistle sound, until it has attracted the attention of the occupants of the car.

The constructing of our pneumatic tire alarm is extremely simple and may be applied readily to any automobile wheel employing the common inner or air tube, by simply perforating the rim and felly to permit of the insertion of the pipe 15. The bulb or sack 9 being formed with the inner tube requires the said tube to be of special but inexpensive construction, and this new tube may be applied about as readily as the old tubes.

When properly constructed and applied the device is entirely automatic in its operation, self-sustaining, and practically indestructible. The device may be applied to wheels having different makes of rims and render effective service.

The addition of the bulb or sack 9 to the air tube will not lessen the resiliency of the tire, and the disposition of the bulb is such that the tube may be inflated by air forced through the filling tube 8 and the air will circulate freely to all parts of said tube the same as formerly.

Having thus described our invention, what we claim as new and desire to secure by Letters Patent, is—

As a new article of manufacture, a pneumatic tire alarm and a compressible air sack for operating said alarm, the said sack comprising an integral part formed in one side of the inner tube of a pneumatic wheel, and disposed between said inner tube and the split side of a common outer tire, the said alarm mounted on the felly of the wheel and operatively connected with said sack, the said sack capable of being compressed by the abnormal flattening of the tire, for sounding said alarm by the force of the air expelled from said sack.

In testimony whereof we affix our signatures in presence of two witnesses.

SAMUEL SILVERMAN.
JOSEPH E. TRAHAN.

Witnesses:
EDGAR V. BLOODOUGH,
HELENA L. BARDOL.